United States Patent [19]

Drexler

[11] Patent Number: 4,917,292
[45] Date of Patent: Apr. 17, 1990

[54] BOOK ON A POCKET CARD

[75] Inventor: Jerome Drexler, Los Altos Hills, Calif.

[73] Assignee: Drexler Technology Corporation, Mountain View, Calif.

[21] Appl. No.: 179,011

[22] Filed: Apr. 21, 1988

[51] Int. Cl.⁴ .......................... G11B 7/007; G11B 7/24
[52] U.S. Cl. .................................... 235/488; 235/487; 235/494; 346/76 L; 369/291; 369/292; 283/904
[58] Field of Search ............... 235/454, 456, 487, 488, 235/494; 283/76, 86, 93, 900, 904; 346/76 L; 369/275, 273, 283, 291, 292

[56] References Cited

U.S. PATENT DOCUMENTS

| | | | |
|---|---|---|---|
| 4,141,400 | 2/1979 | Mangan | 283/904 |
| 4,159,417 | 6/1979 | Rubincam | 235/375 |
| 4,236,332 | 12/1980 | Domo | 40/2.2 |
| 4,316,073 | 2/1982 | Lamelson | 346/76 L |
| 4,486,870 | 12/1984 | Pettigrew et al. | 369/275 |
| 4,503,135 | 3/1985 | Drexler | 369/273 |
| 4,544,181 | 10/1985 | Maurer et al. | 283/904 |
| 4,588,665 | 5/1986 | Drexler | 369/273 |
| 4,632,428 | 12/1986 | Brown | 283/76 |
| 4,656,346 | 4/1987 | Drexler | 235/487 |
| 4,680,459 | 7/1987 | Drexler | 235/487 |
| 4,700,840 | 10/1987 | Haddock | 235/487 |
| 4,790,566 | 12/1988 | Bossier et al. | 283/904 |

Primary Examiner—Steven L. Stephan
Assistant Examiner—Robert A. Weinhardt
Attorney, Agent, or Firm—Thomas Schneck

[57] ABSTRACT

A plastic card or credit card size has a strip of optical recording material thereon containing microtext. The microtext is either electronically or optically reduced from 5 to 200 times and laid out in miniature pages, arranged in an array on the strip. The strip has a metallic or metal particle layer, giving it a shiny gold or silver coloration, against which the microtext appears dark, or vice-versa.

2 Claims, 4 Drawing Sheets

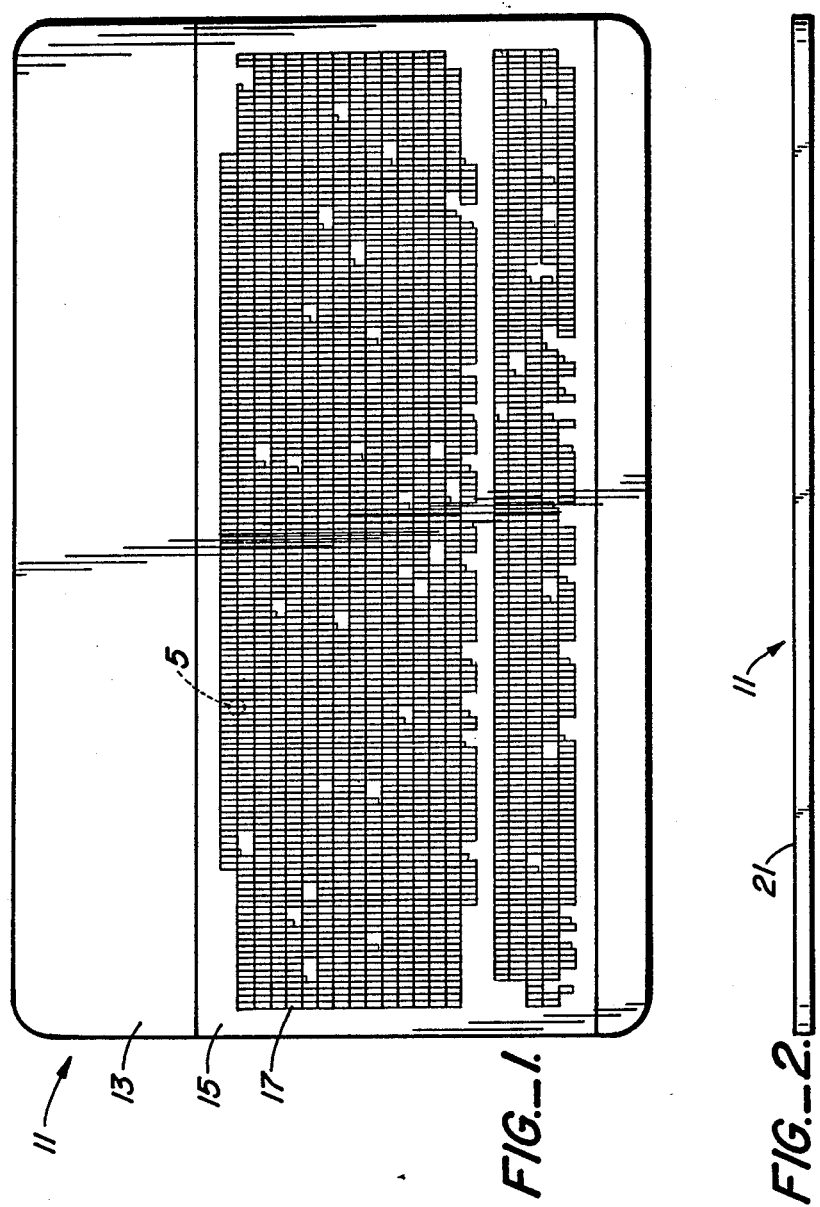

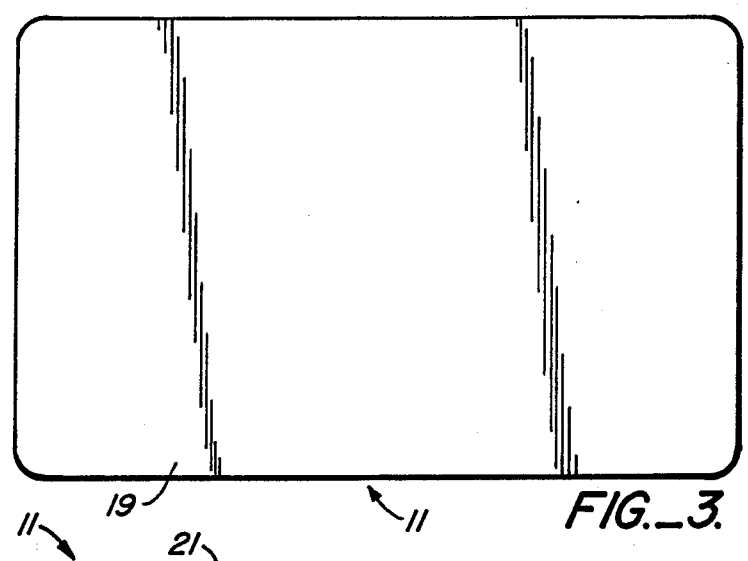
FIG._3.
FIG._4.
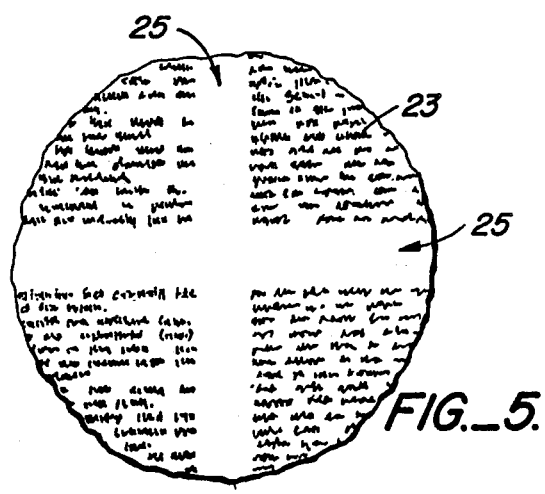
FIG._5.

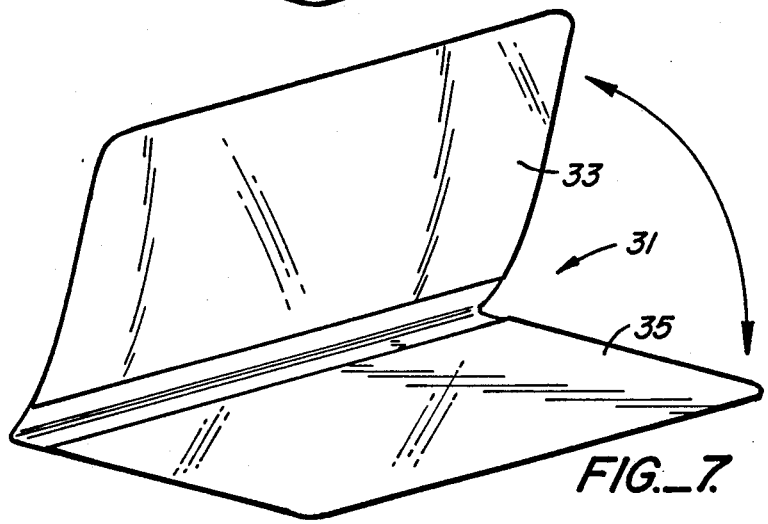
FIG._6.
FIG._7.
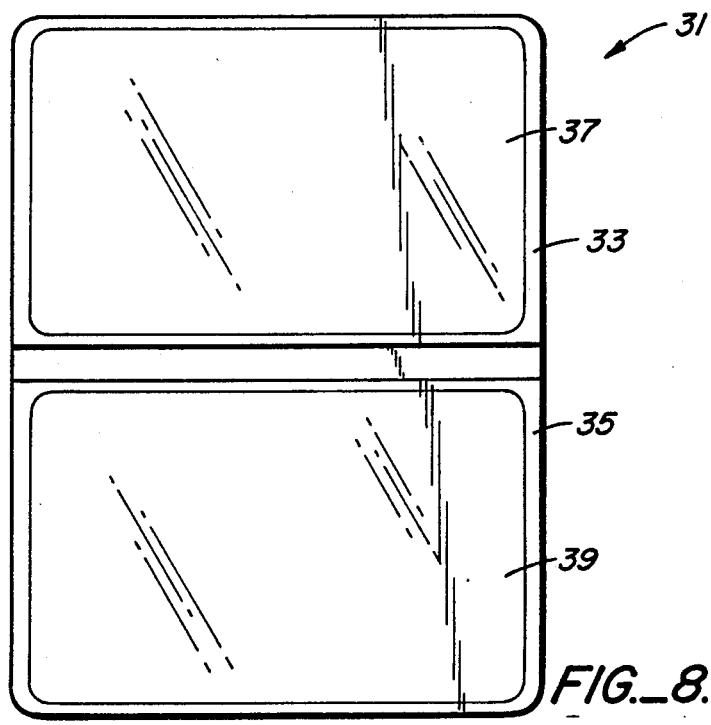
FIG._8.

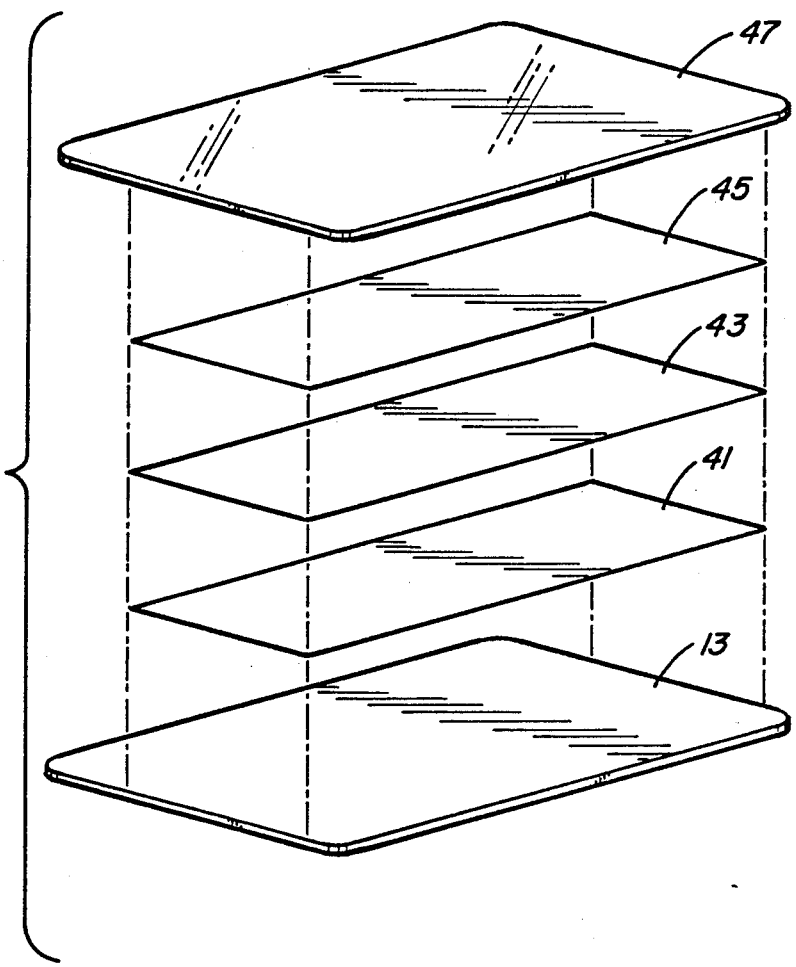
FIG._9.

BOOK ON A POCKET CARD

TECHNICAL FIELD

The invention relates to microtext publishing and in particular to a medium for such publishing.

BACKGROUND ART

One of the best known publications employing microtext is "The Compact Edition of the Oxford English Dictionary", Oxford University Press, 1971. In this work, a large number of volumes of the Oxford English Dictionary have been reduced to two volumes. Ordinary size print has been reduced to the point of being barely readable to the unaided eye. Without microprinting, only libraries and institutions usually had the Oxford English Dictionary. Using microtext, many readers are able to possess this widely recognized work.

Even though microtext on paper is very useful, the works require more handling than usual for two reasons. First, because of the very high information density on each page, the amount of access for each is increased. Secondly, because of the need for magnification, a page will be handled for proper positioning with regard to a magnification apparatus.

Other well-known microtext media are microfilm and microfiche. Such media are used to store records, books and for other uses. An advantage of microfilm and microfiche is that they are more durable than paper and require less space. To use microfilm or microfiche, a reading apparatus is used which projects light through the film or microfiche and then onto a screen where an image is created and sometimes reproduced. A disadvantage of microfilm and microfiche is that they cannot be carried in the pocket, wallet or purse. Microfilm is too bulky and microfiche is 4 inches by 6 inches in size making it too large to be carried in a wallet. Microfilm and microfiche can be scratched in handling since they do not have any protective layer over the recorded surface. Further, microfilm and microfiche are not attractive, particularly for carrying sacred scriptures. Also, microfilm and microfiche require transmissive type readers.

An objective of this invention was to devise a durable microtext medium that is credit card size, has a protective plastic layer over the recorded medium to prevent scratching, and is read in reflection to permit printing on the back of the card.

DISCLOSURE OF THE INVENTION

The above object has been achieved using an opaque card with a planar surface over which a light reflective medium is disposed. This medium has reflectivity greater than 20% and is gold or silver in color. Characters are created on the medium by photolithography or by electroforming. No ink is used. Characters on the medium are reduced in size from the usual height by 5 to 200 times. The characters appear to be dark with regard to the surrounding reflective field because of differences with respect to the coloration of the field or because of scattering of light. Of course, the field could have a reverse relationship with respect to the characters. Either the characters or the field material, or both, are metallic or formed with metal particles. This adds an archival character to the medium. To protect the thin strip, the entire card is covered with a transparent cover.

An advantage of the card is that text characters of an entire book may be photographically reduced and microscopically engraved or etched onto a strip of the type described above which is then adhered to a card. The resulting card provides a very convenient means for providing access to microtext forming a book.

BRIEF DESCRIPTION OF THE DRAWINGS

FIG. 1 is a top plan view of the book card of the present invention.

FIG. 2 is a front elevation of the card of FIG. 1, the rear elevation being identical.

FIG. 3 is a bottom plan view of the card of FIG. 1.

FIG. 4 is a side elevation of the card of FIG. 1, both sides being identical.

FIG. 5 is a magnified detail of the card of FIG. 1 as indicated by dashed line 5 in FIG. 1.

FIG. 6 is a perspective view of a card holder for the card of FIG. 1.

FIG. 7 is a perspective view of the card holder of FIG. 6.

FIG. 8 is a top view of the card holder of FIG. 6 shown with two cards in place.

FIG. 9 is an exploded view, showing card construction for the card of FIG. 1.

BEST MODE FOR CARRYING OUT THE INVENTION

With reference to FIG. 1, a card 11 is shown which is preferably of credit card size. The card includes a planar plastic base 13 and a strip 15 of recording material disposed thereon. The plastic base 13 is opaque and self-supporting. Strip 15 has a metallic coloration, either silver or gold in color. Small rectangles 17 are photolithographically etched or micromachined into the strip. These rectangles are the "pages" of the book containing dark microtext. It is possible to reverse the coloration and provide bright rectangles in a dark field. An electron beam or a finely focused laser beam will be used to create a photomask which in turn will be used to create strip 15 by photolithography. Micromachining techniques could also be used.

A micromachining or photolithographic process used to form alpha-numeric characters maintains a size reduction between 5 and 200 times with regard to ten point type. A size reduction of 100 times will allow up to 1500 normal size pages to be placed on a strip which is approximately 35 mm wide and 85 mm long, with ample borders about the periphery of the strip. Reflectivity of the shiny region should exceed 20% and preferably about 50%.

In the side and edge views of FIGS. 2 and 4, the card is shown to be flat on both sides. Upper surface 21 has a thin transparent plastic cover over the recording strip which, because of its thinness, is not seen in the FIGS. In FIG. 3, the backside 19 is shown to be blank, but could have a strip similar to the front side or could have normal-sized printing affixed thereto, either directly on the plastic base material or on another material adhered to the base.

In FIG. 5, lines of microtext 23 are shown to be arranged in pages, with streets 25 separating the pages. While the rectangles are placed in a side-by-side array, other patterns are also possible, such as a circular pattern or a pattern forming a decorative array when viewed with the unaided eye. The microtext may be formed by optical reduction in a photolithography process or by direct beam writing of microtext, both methods being discussed below.

FIG. 6 is a perspective view of a folded flat card jacket with a pair of cards inside. In FIG. 7, the jacket 31 is shown partially open, having a pair of pockets 33 and 35 wherein the card may be placed. The pockets are opaque on their outside surface, but transparent on the inside.

In FIG. 8, the jacket 31 is shown to be in a fully opened position with a pair of cards 37 and 39 inside of the flaps 33 and 35. When the jacket is closed, both cards are protected.

With reference to FIG. 9, a detailed construction is shown. Card base 13 is shown underlying strips of laminate portions 41, 43 and 45 and then covered by a transparent plastic cover member 47. The laminate members form the storage material and possess the characteristic reflective silver or gold coloration. The storage material need not be a laminate, but may be a single metal-on-substrate medium, such as one of the well-known direct-read-after-write laser recording materials which may be written upon by micromachining. See, for example, U.S. Pat. No. 4,230,939 to de Bont. Thus, there are many variations of FIG. 9. Layers 41, 43 and 45 can be one composite material. Any or all layers 41, 43 and 45 could be the same size as layer 47 and additional layers could be added for mechanical construction purposes.

The preferred embodiment involves a composite material with a lower transparent layer 41 made of Mylar, a tradename for a polyester film. The preferred material over layer 41 is a gelatin polymer layer 43 with an upper crust layer 45 formed thereon consisting of primarily spherical metal particles in a colloidal matrix. The details of the construction of the recording strip may be found in U.S. Pat. No. 4,304,848 entitled "Method for Photographic Replication of Information on an Optical Data Storage Medium". In that patent, a technique is described for converting a photosensitive emulsion into a gelatin and a colloid containing primarily spherical silver particles which form a reflective layer. This reflective layer is represented by the uppermost portion 45 in FIG. 9. The portion 43 is intimately joined with the region 45 and is not a physically separate layer as shown in the drawing. The substrate portion 41 is also intimately joined to layers 43, but 41 was a separate layer before layer 43 was joined to it.

An alternative storage material is formed by vacuum deposition of a metal such as aluminum onto a plastic sheet. In this situation, this metallic underlayer would be portion 41 which would be covered with a photoresist during the manufacturing process. It would be exposed through a photomask and the photoresist would be developed. The aluminum underlayer would be etched and then the photoresist would be stripped off. The text would thus be etched into the aluminum underlayer. Black ink would cover the entire back creating black letters in a reflective aluminum field.

In one embodiment, the thickness of the lower-most portion 41, where the portion is a plastic substrate is approximately 100 microns. The thickness of the intermediate portion 43 where such intermediate portion is a gelatin layer is approximately 4 microns. The thickness of the uppermost colloidal and metal particle layer 45 is approximately 0.5 to 1.5 microns. The thickness of the transparent protective cover 47 ranges between 125 and 400 microns. The preferred material of the transparent plastic cover 47 is polycarbonate with a hardener coating. The thickness of the substrate 13 is about 0.5 millimeter.

Equipment for micromachining or etching by means of photolithography the microtext described herein is well known in the semiconductor industry. Photolithography equipment exists for patterning very fine lines into resist layers which are etched, either ionically or chemically. Alternatively, very fine laser and electron beams may be controlled for creating fine line patterns. The advantage of using photolithography is that a master photomask may be made and then used to replicate the pattern as described in the above-mentioned patent.

An important consideration is to achieve sufficient optical contrast between the microtext and the field so that the text is clearly readable. It should be noted that inks are not used and that the resultant card is durable in character because of the metallic composition of the recording layer. Book cards may now be published containing texts of importance to people who desire to carry such texts. For example, religious texts such as Buddhist, Christian, Confucian and Moslem texts may all be published and carried on a card. With microscope optics, or a magnifying lens of appropriate power, the text can be read under ambient light or illumination.

I claim:

1. A microtext card and jacket comprising,
an opaque card the size of a credit card having a planar surface,
a reflective, metal-containing optically recorded material disposed over the surface of the card, the optically recorded material including unrecorded areas having a distinctive metallic-like reflectance, said optically recorded material further having an array of pages thereon, said pages having lines of microscopic text, with the pages of text reduced from normal book size by 5 to 200 times, the text having optical contrast relative to surrounding areas under light illumination sufficient for reading with magnification, whereby the contents of a book may be recorded on the card,
a transparent protective plastic material bonded to the optically recorded material, and
a foldable card jacket having a pocket containing said microtext card, the pocket having an outside opaque surface through which the card is not visible and an inside transparent surface where the card is visible.

2. The microtext card of claim 1 wherein said metallic-like reflectance is one of gold or silver in color.

* * * * *